(12) United States Patent
Chelarescu et al.

(10) Patent No.: US 11,200,320 B2
(45) Date of Patent: Dec. 14, 2021

(54) COORDINATING SERVICE RANSOMWARE DETECTION WITH CLIENT-SIDE RANSOMWARE DETECTION

(71) Applicant: Microsoft Technology Licensing, LLC, Redmond, WA (US)

(72) Inventors: Filip Chelarescu, Kirkland, WA (US); Ronak M Shah, Redmond, WA (US); Jose A Barreto, Redmond, WA (US); Parthipan Thayanithy, Redmond, WA (US); Meir E. Abergel, Seattle, WA (US); Justin D Harding, Redmond, WA (US); Yolando Pereira, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 15/941,840

(22) Filed: Mar. 30, 2018

(65) Prior Publication Data

US 2019/0303575 A1 Oct. 3, 2019

(51) Int. Cl.
*G06F 21/00* (2013.01)
*G06F 21/56* (2013.01)
*H04L 29/06* (2006.01)

(52) U.S. Cl.
CPC ............ *G06F 21/568* (2013.01); *G06F 21/56* (2013.01); *G06F 21/561* (2013.01); *H04L 63/14* (2013.01);
(Continued)

(58) Field of Classification Search
CPC ...... G06F 21/568; G06F 21/56; G06F 21/561; G06F 2221/033; H04L 63/14; H04L 63/145
See application file for complete search history.

(56) References Cited

U.S. PATENT DOCUMENTS 8,484,737 B1  7/2013  Swift et al.
8,667,583 B2  3/2014  Polyakov et al.
(Continued)

FOREIGN PATENT DOCUMENTS

| CN | 106570396 A | 4/2017 |
| WO | 2017053745 A1 | 3/2017 |
| WO | 2018004891 A1 | 1/2018 |

OTHER PUBLICATIONS

Gonzalez et al., "Detection and prevention of crypto-ransomware", IEEE 8th Annual Ubiquitous Computing, Electronics and Mobile Communication Conference (UEMCON), Date of Conference: Oct. 19-21, 2017.*

(Continued)

*Primary Examiner* — Morshed Mehedi

(74) *Attorney, Agent, or Firm* — Schwegman Lundberg & Woessner, P.A.

(57) ABSTRACT

A cloud storage server receives a detection notification from a client device. The cloud storage server is configured to store files received from the client device. The detection notification indicates a ransomware activity detected by the client device. The cloud storage server receives a remediation notification from the client device. The remediation notification indicates that the ransomware activity has been remediated by the client device. The cloud storage server updates an operation of a server-based ransomware detection application based on the detection notification and the remediation notification.

20 Claims, 11 Drawing Sheets

(52) U.S. Cl.
CPC ...... *H04L 63/145* (2013.01); *G06F 2221/033* (2013.01)

(56) References Cited

U.S. PATENT DOCUMENTS

| | | | |
|---|---|---|---|
| 8,813,222 | B1 | 8/2014 | Codreanu et al. |
| 8,875,294 | B2 | 10/2014 | Golavanov |
| 9,317,686 | B1* | 4/2016 | Ye .................. G06F 11/1448 |
| 9,405,902 | B1 | 8/2016 | Xavier |
| 9,411,955 | B2 | 8/2016 | Jakobsson |
| 9,514,309 | B1 | 12/2016 | Mann |
| 9,680,845 | B2 | 6/2017 | Langton et al. |
| 9,734,337 | B1 | 8/2017 | Patton et al. |
| 9,756,061 | B1 | 9/2017 | Roeh et al. |
| 9,792,436 | B1 | 10/2017 | Sankruthi |
| 9,838,405 | B1 | 12/2017 | Guo et al. |
| 9,852,289 | B1 | 12/2017 | Mann |
| 10,007,795 | B1 | 6/2018 | Chung et al. |
| 10,009,360 | B1 | 6/2018 | Todd et al. |
| 10,055,582 | B1 | 8/2018 | Weaver et al. |
| 10,140,454 | B1 | 11/2018 | Spath et al. |
| 10,187,410 | B2 | 1/2019 | Greenberg et al. |
| 10,409,986 | B1 | 9/2019 | Nantanzon et al. |
| 10,685,114 | B2 | 6/2020 | Scaife et al. |
| 2011/0078497 | A1 | 3/2011 | Lyne et al. |
| 2011/0082838 | A1 | 4/2011 | Niemela |
| 2013/0024435 | A1 | 1/2013 | Poirier et al. |
| 2013/0067576 | A1 | 3/2013 | Niemela |
| 2013/0086683 | A1 | 4/2013 | Thomas et al. |
| 2014/0047544 | A1 | 2/2014 | Jakobsson |
| 2014/0130161 | A1 | 5/2014 | Golavanov |
| 2015/0172304 | A1 | 6/2015 | Kleczynski |
| 2015/0178171 | A1 | 6/2015 | Bish et al. |
| 2016/0124665 | A1 | 5/2016 | Jain et al. |
| 2016/0294851 | A1 | 10/2016 | Langton et al. |
| 2017/0032279 | A1* | 2/2017 | Miserendino et al. .. G06N 5/04 |
| 2017/0177867 | A1 | 6/2017 | Crofton et al. |
| 2017/0180394 | A1 | 6/2017 | Crofton et al. |
| 2017/0206353 | A1* | 7/2017 | Jai .................. G06F 21/565 |
| 2017/0223031 | A1* | 8/2017 | Gu .................. H04L 63/1416 |
| 2017/0270293 | A1 | 9/2017 | Gu et al. |
| 2017/0324755 | A1 | 11/2017 | Dekel et al. |
| 2017/0329965 | A1 | 11/2017 | Dodson |
| 2017/0364681 | A1 | 12/2017 | Roguine et al. |
| 2017/0371547 | A1 | 12/2017 | Fruchtman et al. |
| 2018/0007069 | A1* | 1/2018 | Hunt .................. H04L 63/1416 |
| 2018/0018458 | A1* | 1/2018 | Schmugar ............. G06F 21/566 |
| 2018/0020013 | A1 | 1/2018 | Yoshikawa et al. |
| 2018/0024893 | A1 | 1/2018 | Sella et al. |
| 2018/0027009 | A1* | 1/2018 | Santos ............... H04L 63/1433 726/25 |
| 2018/0034835 | A1* | 2/2018 | Iwanir .................. H04L 63/1416 |
| 2018/0048658 | A1 | 2/2018 | Hittel et al. |
| 2018/0101678 | A1 | 4/2018 | Rosa |
| 2018/0181761 | A1 | 6/2018 | Sinha et al. |
| 2018/0189488 | A1* | 7/2018 | Arora .................. G06F 21/563 |
| 2018/0189490 | A1* | 7/2018 | Maciejak ............. G06F 21/566 |
| 2018/0203997 | A1 | 7/2018 | Charters et al. |
| 2018/0204000 | A1 | 7/2018 | Charters et al. |
| 2018/0211038 | A1 | 7/2018 | Breiman et al. |
| 2018/0212987 | A1 | 7/2018 | Tamir et al. |
| 2018/0248896 | A1* | 8/2018 | Challita ................ G06F 21/554 |
| 2018/0293379 | A1 | 10/2018 | Dahan |
| 2018/0357133 | A1 | 12/2018 | Strogov et al. |
| 2018/0375826 | A1 | 12/2018 | Chang et al. |
| 2019/0065745 | A1* | 2/2019 | Araujo ................ G06F 16/1734 |
| 2019/0109870 | A1* | 4/2019 | Bedhapudi .......... G06F 16/1734 |
| 2019/0130097 | A1 | 5/2019 | Berler et al. |
| 2019/0138727 | A1* | 5/2019 | Dontov ............... H04W 12/009 |
| 2019/0158512 | A1 | 5/2019 | Zhang |
| 2019/0201597 | A1* | 7/2019 | Shelton, IV ........ F04C 18/0215 |
| 2019/0205530 | A1 | 7/2019 | Brown |
| 2019/0228148 | A1 | 7/2019 | Pohl et al. |
| 2019/0228153 | A1 | 7/2019 | Scaife et al. |
| 2019/0303571 | A1 | 10/2019 | Chelarescu et al. |
| 2019/0303572 | A1 | 10/2019 | Chelarescu et al. |
| 2019/0303573 | A1 | 10/2019 | Chelarescu et al. |
| 2019/0306179 | A1 | 10/2019 | Chelarescu et al. |
| 2019/0347415 | A1 | 11/2019 | Yavo et al. |
| 2019/0347419 | A1* | 11/2019 | Geng ................... G06F 21/561 |

OTHER PUBLICATIONS

El-Kosairy et al., "Intusion and ransomware detection system", 2018 1st International Conference on Computer Applications & Information Security (ICCAIS), Date of Conference: Apr. 4-6 (Year: 2018).*

"International Search Report and Written Opinion Issued in PCT Patent Application No. PCT/US19/023770", dated Jun. 25, 2019, 10 Pages.

"International Search Report and Written Opinion Issued in PCT Patent Application No. PCT/US19/023771", dated Jun. 25, 2019, 10 Pages.

"International Search Report and Written Opinion Issued in PCT Patent Application No. PCT/US19/023775", dated Jun. 25, 2019, 10 Pages.

"International Search Report and Written Opinion Issued in PCT Application No. PCT/US2019/023776", dated May 14, 2019, 13 Pages.

"Data Backup and recovery", Retrieved fromhttps://www.pcrisk.com/how-to-remove-spyware/data-backup-and-recovery, Retrieved on: Feb. 5, 2018, 7 Pages.

"Eset vs. Crypto-ransomware", In White Paper of Eset, Retrieved on: Feb. 7, 2018, 9 Pages.

"File Type Detection and Filtration Overview", Retrieved from: https://onlinehelp.opswat.com/corev3/2.4.4._File_Type_Detection_And_Filtration_Overview.html, Retrieved Date: Feb. 5, 2018, 3 Pages.

"Nextcloud presents Ransomware Protection app", Retrieved from: https://help.nextcloud.com/t/nextcloud-presents-ransomware-protection-app/19255, Aug. 8, 2017, 6 Pages.

Hatem, et al., "Malware Detection in Cloud Computing", In Journal of International Journal of Advanced Computer Science and Applications, vol. 5, Issue 4, 2014, pp. 187-192.

Muthurajkumar, et al., "Agent Based Intelligent Approach for the Malware Detection for Infected Cloud Data Storage Files", In Proceedings of Seventh International Conference on Advanced Computing, Dec. 15, 2015, pp. 1-5.

"Client Server Security", Retrieved from<<http://does.trendmicro.com/all/smb/css/v3.6/en-us/css_3.6_gsg.pdf>>, Mar. 2007, 93 Pages.

D-Souza-Wiltshire, et al., "Configure the notifications that appear on endpoints", Retrieved from<<https://docs.microsoft.com/en-us/windows/threat-protection/windows-defender-antivirus/configure-notifications-windows-defender-antivirus>>, Oct. 31, 2017, 5 Pages.

"Non Final Office Action Issued in U.S. Appl. No. 15/941,243", dated Feb. 6, 2020, 21 Pages.

"Non Final Office Action Issued in U.S. Appl. No. 15/941,710", dated Mar. 6, 2020, 14 Pages.

"Non Final Office Action Issued in U.S. Appl. No. 15/941,219", dated Jul. 28, 2020, 16 Pages.

"Notice of Allowance Issued in U.S. Appl. No. 15/941,710", dated Jul. 30, 2020, 19 Pages.

"Non Final Office Action Issued in U.S. Appl. No. 15/942,009", dated Apr. 29, 2020, 22 Pages.

"Final Office Action Issued in U.S. Appl. No. 15/942,009", dated Aug. 31, 2020, 23 Pages.

"Notice of Allowance Issued in U.S. Appl. No. 15/942,009", dated Dec. 3, 2020, 14 Pages.

"Final Office Action issued in U.S. Appl. No. 15/941,219", dated Apr. 21, 2021, 17 Pages.

"Non-Final Office Action Issued in U.S. Appl. No. 15/941,219", dated Jun. 24, 2021, 17 Pages.

* cited by examiner

US 11,200,320 B2

COORDINATING SERVICE RANSOMWARE DETECTION WITH CLIENT-SIDE RANSOMWARE DETECTION

TECHNICAL FIELD

The subject matter disclosed herein generally relates to a special-purpose machine that detects ransomware-impacted files at a client device and at a cloud storage system and improves the coordination of the detection of ransomware-impacted files between the client device and the cloud storage system, including computerized variants of such special-purpose machines and improvements to such variants, and to the technologies by which such special-purpose machines become improved compared to other special-purpose machines that detect ransomware. Specifically, the present disclosure addresses systems and methods for coordinating detection of ransomware-impacted files between the client device and the cloud storage system, and updating the client device and the cloud storage system based on the coordinated detection.

BACKGROUND

Conventionally, a ransomware attack on a computer modifies some files stored on the computer by encrypting the file's content and holding the encryption files for ransom. A user of the computer may not have another recourse to recover the encrypted files besides paying the ransom. If the ransom is not paid within a specified time, the files are permanently lost.

BRIEF DESCRIPTION OF THE DRAWINGS

Some embodiments are illustrated by way of example and not limitation in the figures of the accompanying drawings.

DETAILED DESCRIPTION

Figure 1:
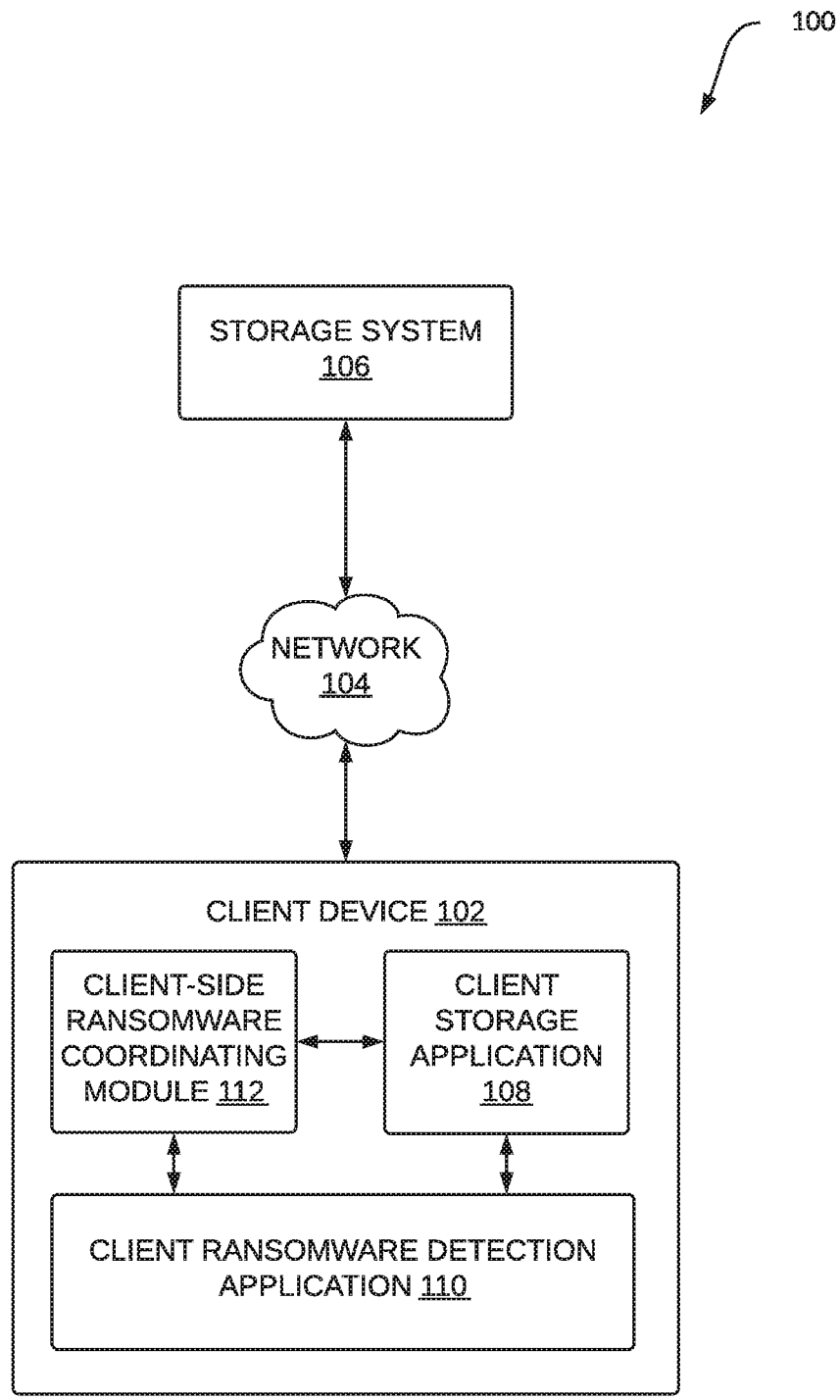
FIG. 1 is a block diagram illustrating an example environment for detecting ransomware-impacted files in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) detect and identify ransomware-impacted files stored in a cloud storage system or at a client device and coordinate the notification and remediation in the cloud storage system and the client device between the server-based ransomware detection application and the client-based ransomware detection application. The files stored in the cloud storage server may be synced to a drive or folder at a corresponding client device registered with the cloud storage server.

In one example embodiment, the server-based ransomware detection application performs a series of tests on individual files (and heuristics for several files) in the cloud storage account of the client device. Examples of tests include detecting whether a previously un-encrypted file is now encrypted, detecting whether a file has been renamed with a file extension or naming pattern associated with ransomware, detecting whether a content of the file matches with a type of content identified by the name extension of the file, using machine learning based on user feedback to determine whether the file is impacted with ransomware. Once the server-based ransomware detection application has confirmed a file is impacted by ransomware, the cloud storage server notifies the client-based ransomware detection application and shares the information about the ransomware with the client-based ransomware detection application. The client-based ransomware detection application may pause a file syncing operation between the client and the server until a remediation of the ransomware is received from the server-based ransomware detection application.

In another example embodiment, the server-based ransomware detection application receives, from a client-based ransomware detection application, a notification of a file impacted by ransomware at the client device. The client device notifies the server-based ransomware detection application and shares the information about the ransomware with the server-based ransomware detection application. The server-based ransomware detection application may pause an operation of the server-based ransomware detection application until a remediation of the ransomware is received from the client-based ransomware detection application.

As a result, one or more of the methodologies described herein facilitate solving the technical problem of lack of effective coordination and communication between a client-based ransomware detection application and a server-based ransomware detection application. As such, one or more of the methodologies described herein may obviate a need for certain efforts or computing resources that otherwise would be involved in generating duplicate notifications (e.g., one notification from the client device and another notification from the storage server) and duplicate remediation options (e.g., options from the client device, options from the storage server). As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for detecting ransomware-impacted files in accordance with an example embodiment. In example embodiments, a storage system 106 stores copies of files from the client device 102. The storage system 106 will be discussed in more detail in connection with FIG. 2 below.

The storage system 106 is coupled, via a network 104, to one or more client devices (e.g., client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a client storage application 108, a client ransomware detection application 110, and a client-side ransomware coordinating module 112. The client storage application 108 is configured to communicate files (e.g., send and receive files) or modifications in the files to be stored at the storage system 106. For example, the client storage application 108 syncs local files stored in a preset directory or folder at the client device 102 with a corresponding direction or folder at the storage system 106. Therefore, changes made to a local file in the preset folder of the client device 102 are propagated to a corresponding remote file (a copy of the local file) in the storage system 106. In one example, the client storage application 108 registers the client device 102 with the storage system 106 and communicates copies of the user-selected local files from the client device 102 to the storage system 106. In another example, changes made to a remote file at the storage system 106 are propagated back to a corresponding local file in the client device 102.

In one example embodiment, the client ransomware detection application 110 detects whether a file locally stored at the client device 102 is impacted (or also referred to as infected) by ransomware (or malware). The client ransomware detection application 110 generates a notification to the client-side ransomware coordinating module 112 and to the client storage application 108. The client storage application 108 pauses a syncing between the client storage application 108 and the storage system 106 in response to the notification. The client-side ransomware coordinating module 112 pauses ransomware notifications from the storage system 106 in response to the detection of a ransomware-impacted local file at the client device 102. The client-side ransomware coordinating module 112 shares information of the ransomware detection to the storage system 106. Once the client ransomware detection application 110 remedies the ransomware-impacted local file, the client-side ransomware coordinating module 112 shares the remedy (e.g., deleting the impacted file or request for a previous version from the storage system) and resumes ransomware notifications from the storage system 106.

In another example embodiment, the client-side ransomware coordinating module 112 receives a detection notification from the storage system 106 that indicates a ransomware-impacted file detected at the storage system 106. The client storage application 108 pauses a syncing between the client storage application 108 and the storage system 106 in response to the detection notification from the storage system 106. The storage system 106 shares information of the ransomware detection to the client ransomware detection application 110 via the client-side ransomware coordinating module 112. Once the storage system 106 remedies the ransomware-impacted file at the storage system 106, the storage system 106 shares the remedy (e.g., deleting the impacted file or restoring to a previous version from the storage system 106) with the client-side ransomware coordinating module 112. The client ransomware detection application 110 resumes generating ransomware notifications by client ransomware detection application 110.

The client device 102 comprises, but is not limited to, a smartphone, tablet, laptop, multi-processor system, microprocessor-based or programmable consumer electronics, game console, set-top box, or any other device that a user utilizes to communicate over the network 104. In example embodiments, the client device 102 comprises a display module (not shown) to display information (e.g., in the form of specially configured user interfaces). In some embodiments, the client device 102 may comprise one or more of a touch screen, camera, keyboard, microphone, and Global Positioning System (GPS) device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 102 may be embodied within the environment 100. Furthermore, some components or functions of the environment 100 may be combined or located elsewhere in the environment 100. For example, some of the functions of the client storage application 108 may be embodied at the storage system 106.

Figure 2:
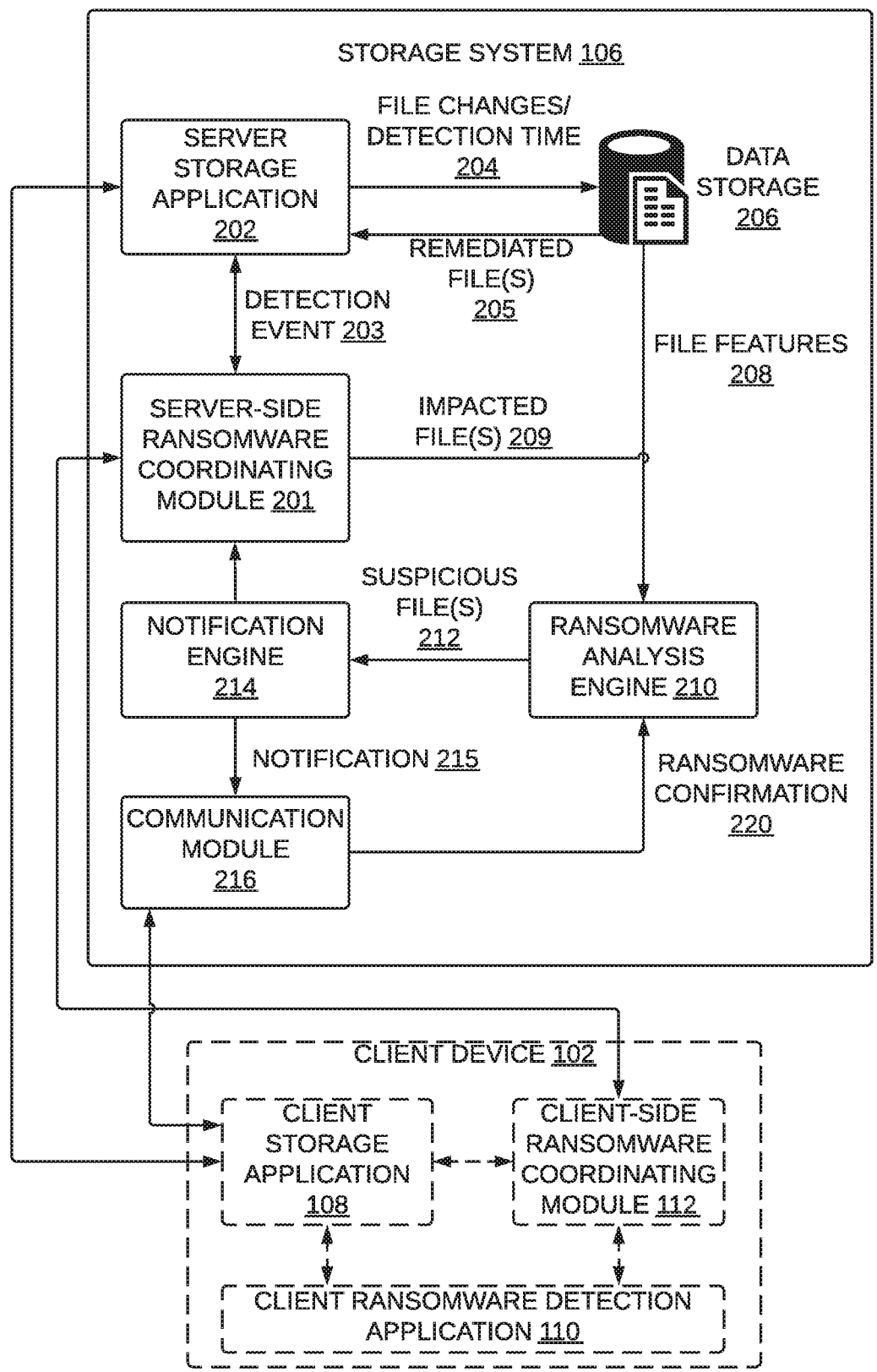
FIG. 2 is a block diagram illustrating components within a storage system in accordance with an example embodiment.

FIG. 2 is a block diagram illustrating components within a storage system in accordance with an example embodiment. In example embodiments, the storage system 106 performs operations to detect and identify ransomware-impacted files stored in a cloud storage system (or at a client device) and coordinate the notification and remediation in the cloud storage system and the client device between the server-based ransomware detection application and the client-based ransomware detection application. To enable these operations, the storage system 106 comprises a server-side ransomware coordinating module 201, a server storage application 202, a data storage 206, a ransomware analysis engine 210, a notification engine 214, and a communication module 216, all of which are configured to communicate with each other (e.g., over a bus, shared memory, or a switch) in accordance with an example embodiment.

The server storage application 202 is configured to interface and communicate with the client storage application 108. The server storage application 202 receives a copy of a new or modified file from the client storage application 108. The server storage application 202 may also receive a request from the client storage application 108 to add the new file in the data storage 206 or to replace an existing corresponding file with the modified file in the data storage 206.

In other example embodiments, the server storage application 202 receives and sends copies of files between the storage system 106 and the client device 102. In one example, the server storage application 202 is configured with the client storage application 108 to store one or more versions of copies of files received from the client storage application 108. For example, the server storage application 202 registers the client storage application 108 and forms a folder or a directory (that corresponds to a user-selected folder or directory at the client device 102) at the storage system 106. Therefore, any changes to a file in the folder at the client device 102 is replicated to the corresponding file in the corresponding folder at the storage system 106.

In another example embodiment, the server storage application 202 identifies historical changes to a file stored at the storage system 106 based on the different versions of a file received from the client storage application 108. The server storage application 202 stores file changes (e.g., a new file or a modified file) 204 and optionally a malware detection time associated with the file in the data storage 206.

The data storage 206 is configured to store the files (e.g., new or modified files 204) received from the server storage application 202. The files may be copies of files stored at the client device 102. In one example, the data storage 206 is configured to store several versions of the files based on the date and time from the different versions of the files. The files may include attributes such as file name, file extension, and size. Those of ordinary skills in the art will recognize that the files can include other, different types of attributes.

In example embodiments, the data storage 206 is configured to store files and user information for individual users in user-specific data stores or databases (hereinafter collectively referred to as a "user data structure"). For instance, each user data structure may correspond to a folder and/or a directory of the client device 102 of a user. While the data storage 206 is shown to be a part of the storage system 106, in some embodiments, the data storage 206 may be located elsewhere in the environment 100 and be communicatively coupled to the storage system 106. Additionally, any number of data storages 206 may be used to store the user data structures.

In example embodiments, the data storage 206 provides file features 208 of the new or modified file (received from the server storage application 202) to the ransomware analysis engine 210. In another example embodiment, the data storage 206 provides stored copies of the new or modified file 204 to the ransomware analysis engine 210.

The ransomware analysis engine 210 performs a series of tests on the new or modified file 204 (or the file features 208 of the new or modified file 204) to detect whether the new or modified file 204 is impacted with ransomware. The ransomware analysis engine 210 will be discussed in more detail in connection with FIG. 3 below. Once the ransomware analysis engine 210 determines that the new or modified file 204 is impacted with ransomware, the ransomware analysis engine 210 provides an identification of the suspicious file 212 (e.g., new or modified file 204) to the notification engine 214.

The notification engine 214 generates a notification 215 that requests a user of the client storage application 108 to confirm and validate whether the suspicious file 212 is impacted with ransomware. The notification 215 includes, for example, an identification of the suspicious file 212, a time of the suspected infection, a version of the suspicious file 212, an identification of who last modified the suspicious file 212, an identification of the name of the suspected ransomware (or malware), and an identification of suspicious changes in the name or content of the suspicious file 212. The notification engine 214 provides the notification 215 to the communication module 216.

The notification engine 214 also provides a ransomware detection notification to the server-side ransomware coordinating module 201 to indicate that the ransomware analysis engine 210 has detected a ransomware-impacted file (e.g., suspicious file 212) stored in a data structure (associated with the client device 102) of the data storage 206.

The server-side ransomware coordinating module 201 shares the ransomware information (e.g., name, features, and properties of the ransomware and the ransomware-impacted file) about the ransomware-impacted file with the client-side ransomware coordinating module 112. The server-side ransomware coordinating module 201 shares information about the detection event 203 (e.g., ransomware information) with the server storage application 202. The server storage application 202 retrieves a remediated file 205 from the data storage 206 based on the detection event 203. The server storage application 202 also stops communicating with the client storage application 108 and stops syncing files with the data storage 206 until the server-side ransomware coordinating module 201 indicates that the suspicious file 212 has been remediated.

The client-side ransomware coordinating module 112 receives a ransomware detection notification from the server-side ransomware coordinating module 201 and pauses a syncing between the client storage application 108 and the server storage application 202 until the client-side ransomware coordinating module 112 receives a remediation notification from the server-side ransomware coordinating module 201.

In another example embodiment, the client ransomware detection application 110 detects a local ransomware-impacted file at the client device 102 and generates a local ransomware detection notification to the client-side ransomware coordinating module 112. The client-side ransomware coordinating module 112 shares the ransomware information (e.g., name, features, and properties of the ransomware and the ransomware-impacted file) about the local ransomware-impacted file with the server-side ransomware coordinating module 201.

The server-side ransomware coordinating module 201 shares information about the local ransomware-impacted file (e.g., impacted file 209) to the ransomware analysis engine 210 (so that the ransomware analysis engine 210 can learn from the shared information). The client storage application 108 retrieves a remediated file 205 from the data storage 206. The server storage application 202 also stops communicating with the client storage application 108 and stops syncing files with the data storage 206 until the client-side ransomware coordinating module 112 indicates that the local ransomware-impacted file has been remediated.

The communication module 216 is configured to exchange communications with the client device 102. For example, the communication module 216 transmits the notification 215 to the client storage application 108. The communication module 216 receives a ransomware confirmation 220 from the client storage application 108 in response to sending out the notification 215. The ransomware confirmation 220 indicates a user (of the client device 102) confirmation of whether the suspicious file 212 is indeed impacted with ransomware. The communication module 216 forwards the user feedback (e.g., ransomware confirmation 220) to the ransomware analysis engine 210.

In other example embodiments, the communication module 216 includes a user interface module (not shown) that is configured to cause presentation of specially configured user interfaces on the client device 102 that include a visual indication of the ransomware-impacted file and other pertinent information (e.g., time of infection, last modified author, size change). The user interface module generates and transmits instructions to the client device 102 to render and display the user interfaces.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The storage system 106 may comprise other components not pertinent to example embodiments that are not shown or discussed. Further still, one or more of the components of the storage system 106 may be located at one or more of the client devices 102.

Figure 3:
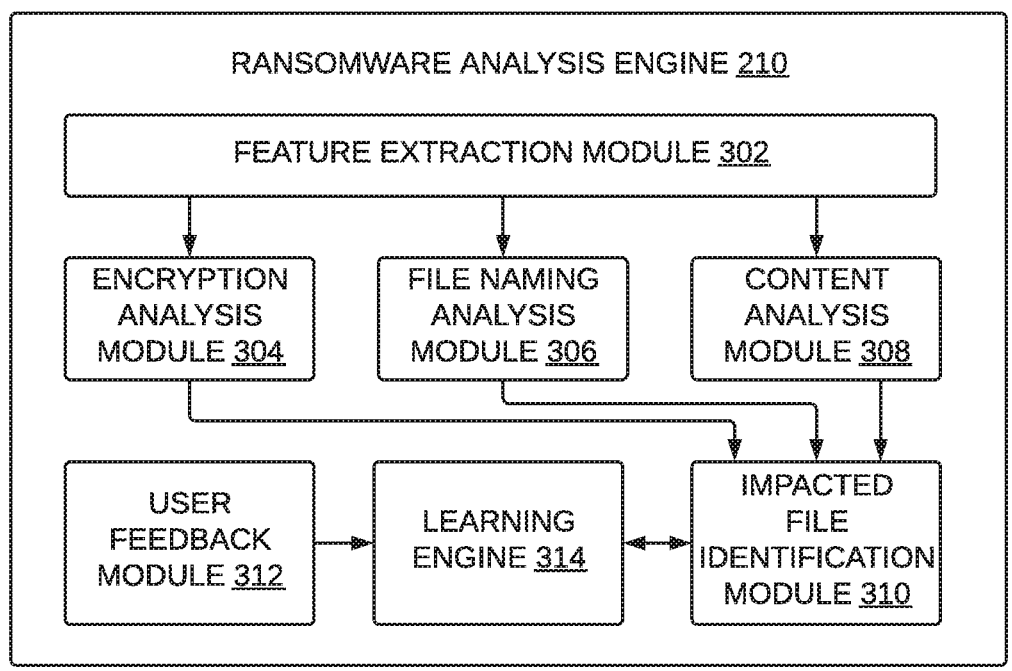
FIG. 3 is a block diagram illustrating components within a ransomware analysis engine in accordance with an example embodiment.

FIG. 3 is a block diagram illustrating components within a ransomware analysis engine in accordance with an example embodiment. The ransomware analysis engine 210 performs operations to detect and identify ransomware-impacted files stored in the data storage 206 and to improve the detection of ransomware using feedback validation from users of the data storage 206. To enable these operations, the ransomware analysis engine 210 comprises a feature extraction module 302, an encryption analysis module 304, a file naming analysis module 306, a content analysis module 308, a user feedback module 312, a learning engine 314, and an impacted file identification module 310, all of which are configured to communicate with each other (e.g., over a bus, shared memory, or a switch) in accordance with an example embodiment.

The features extraction module 302 extracts features from a file stored at the data storage 206. In one example, the features extraction module 302 extracts features from a last modified file or a new file received from the client storage application 108 via the server storage application 202. Examples of features (also referred to as attributes or properties in the present document) include, but are not limited to, attributes of the files such as file encryption status, extension name, date of creation, date of modification, versioning number, author name, type of media, and compression status.

The encryption analysis module 304 determines the encryption status of the new or modified file based on the extracted features of the file. For example, the encryption analysis module 304 determines that the encryption status of the modified file has change (e.g., from non-encrypted to encrypted: a modified file is now encrypted whereas a previous version of the corresponding file is encrypted). In another example, the encryption analysis module 304 determines that the new file is encrypted. The encryption analysis module 304 provides the encryption status of the new or modified file to the impacted file identification module 310.

The file naming analysis module 306 determines a name of the new or modified file and the name of the extension of the new or modified file based on the extracted features of the new or modified file. For example, the file naming analysis module 306 compares the name of the new or modified file with the name of known ransomware file names. In another example embodiment, the file naming analysis module 306 determines whether there is an increase in file renames in the folder of the data storage 206 corresponding to the folder in the client device 102. In other example embodiments, the file naming analysis module 306 monitors for text strings associated with known ransomware. The file naming analysis module 306 provides the ransomware file name matching results of the new or modified file to the impacted file identification module 310.

The content analysis module 308 determines whether a file content does not match its file type (based on its extension name, header, or mime type). For example, the content analysis module 308 determines that the content in a .jpg file is not an image. The content analysis module 308 provides the result of its content analysis of the new or modified file to impacted file identification module 310.

The user feedback module 312 is configured to receive feedback (e.g., confirmation and validation of the presence of ransomware in a new or modified file) from the client storage application 108 of the client device 102. For example, the user feedback module 312 receives a ransomware confirmation from the client storage application 108 based on a user feedback at the client storage application 108. The user feedback indicates whether the new or modified file is indeed impacted with ransomware. The user feedback module 312 provides the user feedback (e.g., ransomware confirmation 220) to the learning engine 314.

The learning engine 314 (e.g., a machine learning algorithm) manages a learning model (e.g., supervised or unsupervised) for identifying ransomware files. The learning engine 314 accesses file information (associated with the client device 102) from the data storage 206. The file information includes attributes, extensions, features (including user feedback) of old, new, and modified files associated with the client device 102. Using the file information, the learning engine 314 can identify trends or patterns. For example, the learning engine 314 learns, based on file extensions, that the new file is actually not related to a ransomware, as confirmed by the user of the client device 102, because the user has named the file to a name similar to a known ransomware. In another example, the learning engine 314 learns that a file that is encrypted and has a file extension name with a particular naming pattern (e.g., previously associated with existing ransomware) is likely a ransomware.

Based on the learning model, the learning engine 314 can, in one embodiment, suggest to the impacted file identification module 310 that the new or modified file is likely or is not likely a ransomware. In a further embodiment, the learning engine 314 updates a list of files that have been confirmed or validated as safe (non-impacted by ransomware) from the client device 102. All of the trends or patterns identified by the learning engine 314 may be stored in the data storage 206 and provided to the impacted file identification module 310 for further processing.

In other example embodiments, the learning engine 314 determines the number of files (in the account of the client device 102 in the data storage 206) being updated, deleted, created, encrypted, and with suspicious extensions, and generates a determination or confidence level that one of the files (or the user account) is impacted by a malware or ransomware attack.

The impacted file identification module 310 receives the results from the encryption analysis module 304, the file naming analysis module 306, the content analysis module 308, and the learning engine 314 to assess and determine whether the new or modified file is likely impacted by a ransomware. In example embodiments, the impacted file identification module 310 provides a range of confidence that the new or modified file is likely impacted by a ransomware. For example, the impacted file identification module 310 determines that a modified file is likely impacted by a ransomware based on a determination that the modified file is now encrypted (and an immediate previous version of the modified file was unencrypted), that the extension name of the file matches portions of text strings associated with known ransomware, and based on previous user feedback (from the client device 102 or from other users or client devices with files sharing the same attributes or features).

Figure 4:
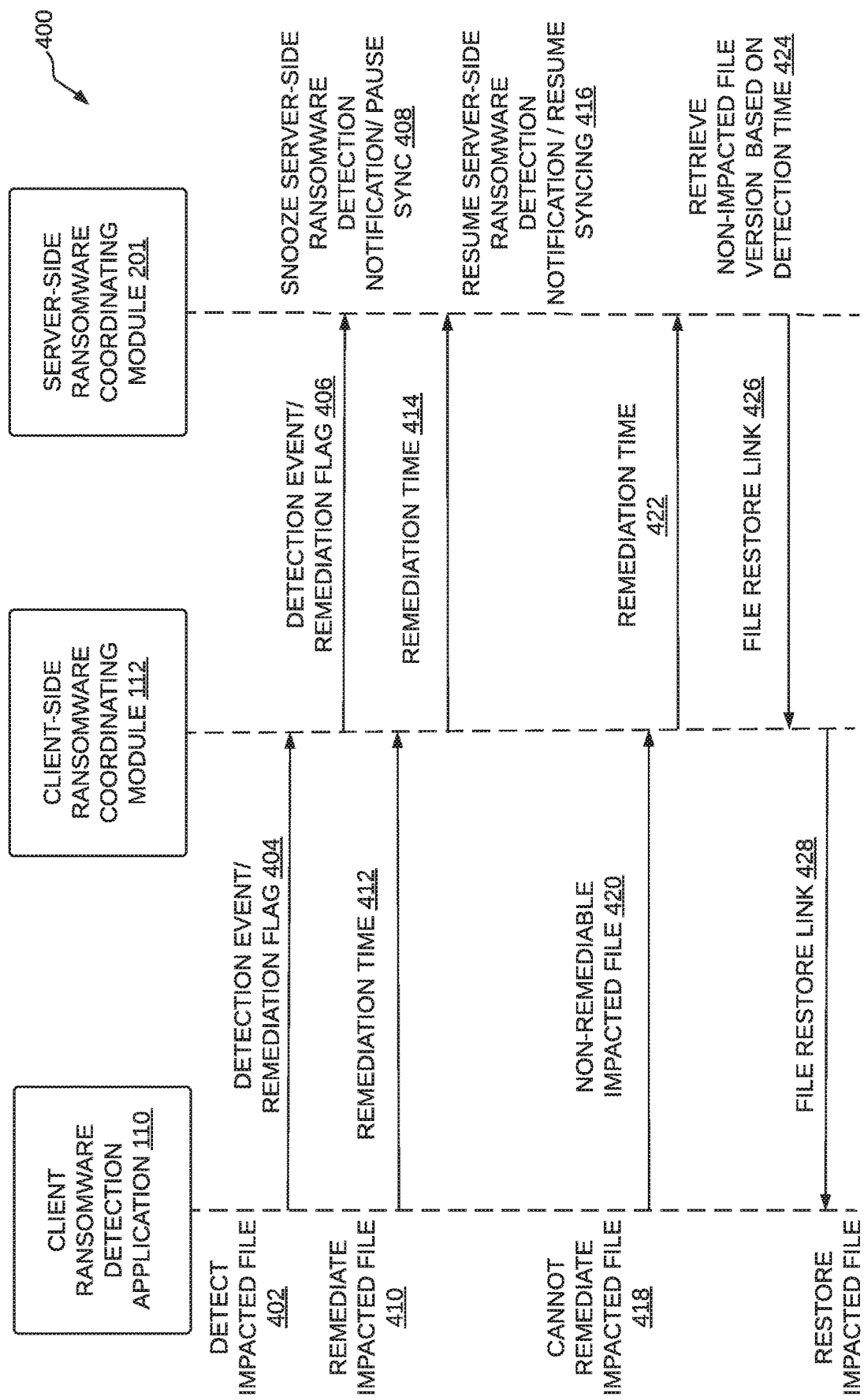
FIG. 4 is a block diagram illustrating an interaction method between components of the client device and the storage system in accordance with an example embodiment.

FIG. 4 is a block diagram illustrating an interaction method between components of the client device and the storage system in accordance with an example embodiment. Operations in the interaction method 400 may be performed between the client ransomware detection application 110, the client-side ransomware coordinating module 112, and the server-side ransomware coordinating module 201 described above with respect to FIGS. 1 and 2. Accordingly, the interaction method 400 is described by way of example with reference to the storage system 106 and the client device 102. However, it shall be appreciated that at least some of the operations of the method 400 may be deployed on various other hardware configurations or be performed by similar components residing elsewhere. For example, some of the operations may be performed in a third-party device.

In operation 402, the client ransomware detection application 110 detects a locally impacted file (e.g., suspicious file possibly impacted by ransomware). The client ransomware detection application 110 includes an antimalware detection application such as an antivirus application.

In operation 404, the client ransomware detection application 110 provides the detection event information (e.g., information about the locally impacted file) and remediation flag (e.g., flag indicates that the client device 102 has successfully cleaned (or failed to clean) the impacted file, whether the synced file at the storage system 106 is also impacted) to the client-side ransomware coordinating module 112.

In operation 406, the client-side ransomware coordinating module 112 provides the detection event information and the remediation flag to the server-side ransomware coordinating module 201. In another embodiment, the client-side ransomware coordinating module 112 requests that the client storage application 108 pauses or stops syncing with the server storage application 202 until remediation of the impacted file.

In operation 408, the server-side ransomware coordinating module 201 snoozes its server-side ransomware detection and notification and pauses syncing with the client device 102 after receiving the detection event.

At operation 410, the client ransomware detection application 110 remediates the impacted file. At operation 412, the client ransomware detection application 110 confirms the remediation and notifies the client-side ransomware coordinating module 112 of the remediation time (e.g., time when the impacted file has been remediated). At operation 414, the client-side ransomware coordinating module 112 notifies the server-side ransomware coordinating module 201 of the remediation. In response, at operation 416, the server-side ransomware coordinating module 201 resumes the server-side ransomware detection and/or notification and resumes syncing with the client device 102 after receiving confirmation of the remediation and the remediation time.

In another example embodiment, at operation 418, the client ransomware detection application 110 determines that it cannot locally remediate the impacted file and notifies the client-side ransomware coordinating module 112 of the non-remediable impacted file. At operation 422, the client-side ransomware coordinating module 112 determines a remediation time (e.g., time at which the file was likely not impacted by the ransomware) and provides the remediation time to the server-side ransomware coordinating module 201. At operation 424, the server-side ransomware coordinating module 201 retrieves the non-impacted version of the file based on the remediation/detection time. At operation 426, the server-side ransomware coordinating module 201 provides a file restore link that provides access to the non-impacted version of the file to the client-side ransomware coordinating module 112. At operation 428, the client-side ransomware coordinating module 112 provides the file restore link to the client ransomware detection application 110. At operation 430, the client ransomware detection application 110 restores the impacted file to the non-impacted version of the file by using the file restore link to access the non-impacted version of the file from the data storage 206.

Figure 5:
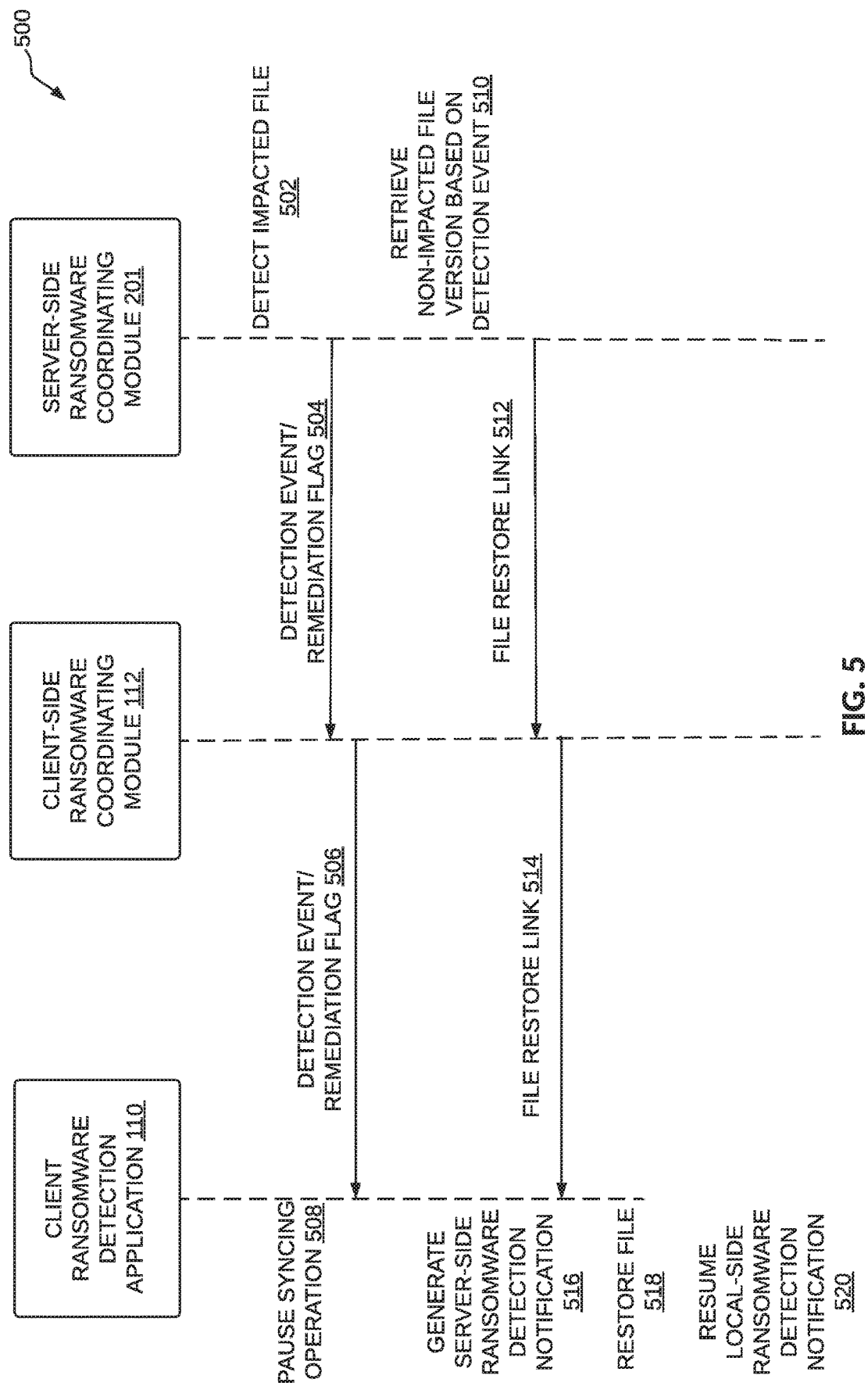
FIG. 5 is a block diagram illustrating an interaction method between components of the client device and the storage system in accordance with another example embodiment.

FIG. 5 is a block diagram illustrating interactions between components of the client device and the storage system in accordance with another example embodiment. Operations in the interaction method 500 may be performed between the client ransomware detection application 110, the client-side ransomware coordinating module 112, and the server-side ransomware coordinating module 201 described above with respect to FIGS. 1 and 2. Accordingly, the interaction method 500 is described by way of example with reference to the storage system 106 and the client device 102. However, it shall be appreciated that at least some of the operations of the method 500 may be deployed on various other hardware configurations or be performed by similar components residing elsewhere. For example, some of the operations may be performed in a third-party device.

In operation 502, the server-side ransomware coordinating module 201 detects an impacted file (e.g., suspicious file possibly impacted by ransomware) using the ransomware analysis engine 210.

In operation 504, the server-side ransomware coordinating module 201 provides the detection event information (e.g., information about the locally impacted file) and remediation flag (e.g., flag indicates that the storage system 106 has successfully cleaned (or failed to clean) the impacted file, whether the synced file at the client device 102 is also impacted) to the client-side ransomware coordinating module 112.

In operation 506, the client-side ransomware coordinating module 112 provides the detection event information and the remediation flag to the client ransomware detection application 110. In another embodiment, the client-side ransomware coordinating module 112 requests that the client storage application 108 pauses or stops syncing with the server storage application 202 until remediation of the impacted file.

In operation 508, the client ransomware detection application 110 pauses syncing with the storage system 106 after receiving the detection event.

At operation 510, the server-side ransomware coordinating module 201 remediates the impacted file by retrieving a non-impacted file version based on the detection event (e.g., detection time). At operation 512, the server-side ransomware coordinating module 201 provides the client-side ransomware coordinating module 112 with a file restore link that provides access to the non-impacted file version. At operation 514, the client-side ransomware coordinating module 112 notifies the client ransomware detection application 110 and provides the file restore link. At operation 516, the client ransomware detection application 110 generates a server-side ransomware detection notification. At operation 518, the client ransomware detection application 110 restores the impacted file using the file restore link. At operation 520, the client ransomware detection application 110 resumes the local-side ransomware detection and notification and resumes syncing with the storage system 106.

Figure 6:
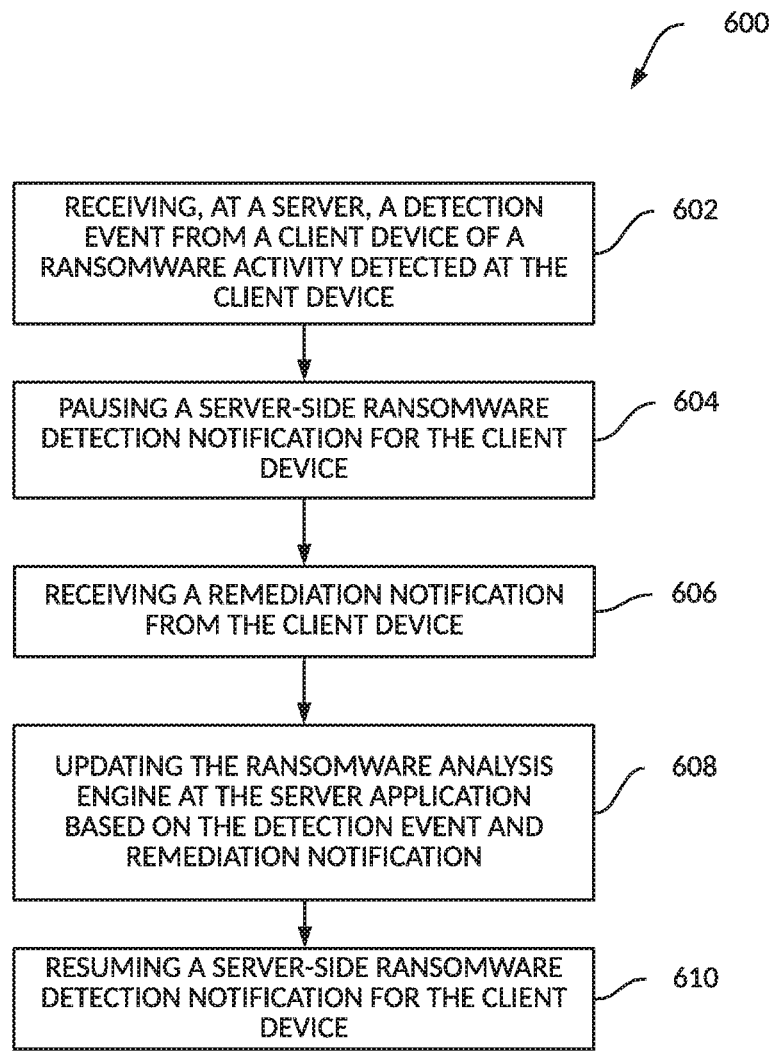
FIG. 6 is a flow diagram of a method for coordinating a ransomware detection at a storage system in accordance with an example embodiment.

FIG. 6 is a flow diagram of a method for coordinating a ransomware detection at a storage system in accordance with an example embodiment. Operations in the method 600 may be performed by the storage system 106, using components (e.g., modules, engines) described above with respect to FIG. 2. Accordingly, the method 600 is described by way of example with reference to the storage system 106. However, it shall be appreciated that at least some of the operations of the method 600 may be deployed on various other hardware configurations or be performed by similar components residing elsewhere. For example, some of the operations may be performed at the client device 102.

At operation 602, the server-side ransomware coordinating module 201 receives a detection event from the client-side ransomware coordinating module 112 indicating that a ransomware activity is detected by the client device 102.

At operation 604, the server-side ransomware coordinating module 201 pauses a server-side ransomware detection notification to the client device 102 (e.g., pausing an operation of the notification engine 214 or the communication module 216).

At operation 606, the server-side ransomware coordinating module 201 receives a remediation notification from the client-side ransomware coordinating module 112 indicating that a ransomware activity at the client device 102 has been remediated.

At operation 608, the server-side ransomware coordinating module 201 updates the ransomware analysis engine 210 based on the detection event, the remediation notification, and information shared by the client-side ransomware coordinating module 112.

At operation 610, the server-side ransomware coordinating module 201 resumes server-side ransomware detection notifications to the client device 102 (e.g., resuming an operation of the notification engine 214 or the communication module 216).

Figure 7:
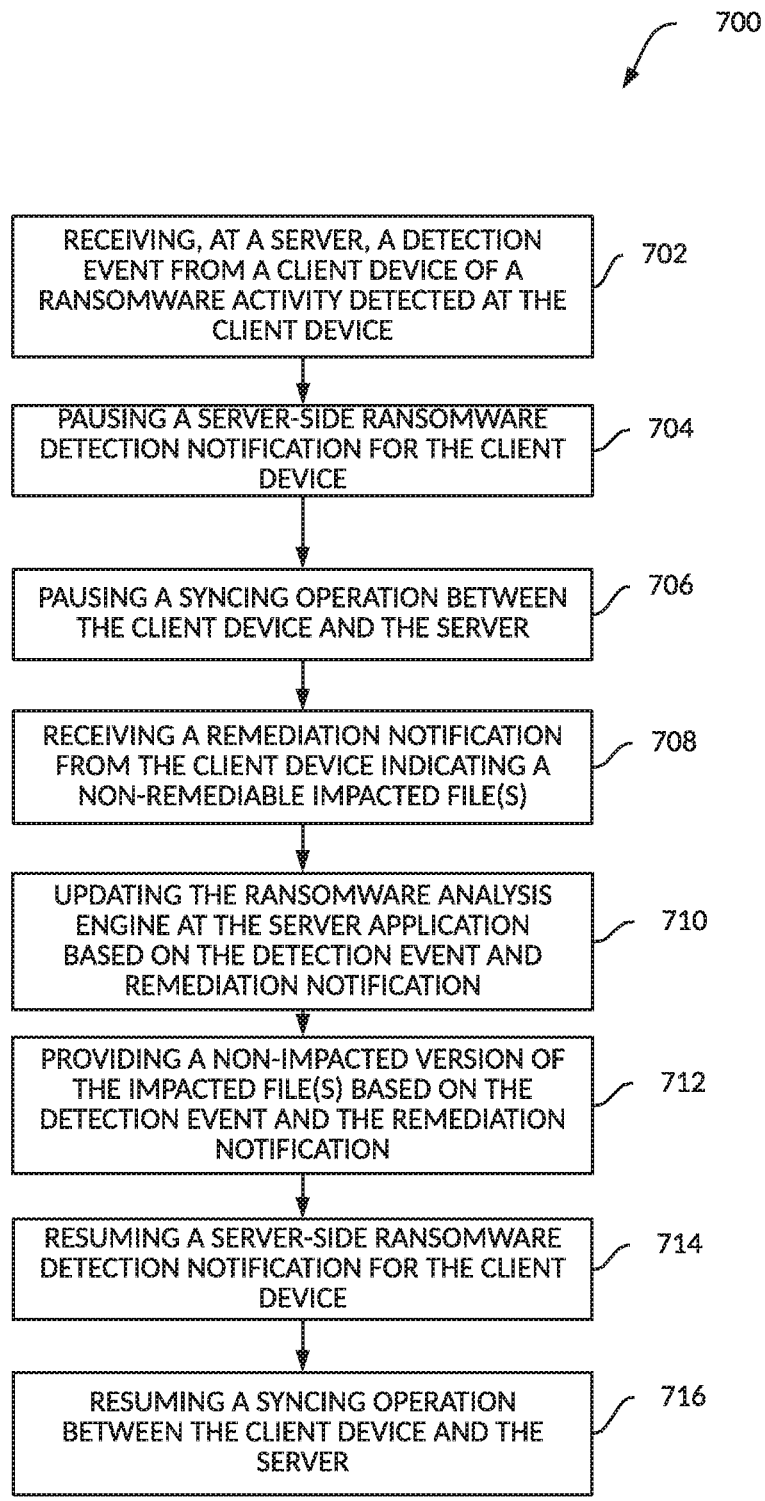
FIG. 7 is a flow diagram of a method for coordinating a ransomware detection at a storage system in accordance with another example embodiment.

FIG. 7 is a flow diagram of a method for coordinating a ransomware detection at a storage system in accordance with another example embodiment. Operations in the method 700 may be performed by the storage system 106, using components (e.g., modules, engines) described above with respect to FIG. 2. Accordingly, the method 700 is described by way of example with reference to the storage system 106. However, it shall be appreciated that at least some of the operations of the method 700 may be deployed on various other hardware configurations or be performed by similar components residing elsewhere. For example, some of the operations may be performed at the client device 102.

At operation 702, the server-side ransomware coordinating module 201 receives a detection event from the client-side ransomware coordinating module 112 indicating that a ransomware activity is detected by the client device 102.

At operation 704, the server-side ransomware coordinating module 201 pauses a server-side ransomware detection notification to the client device 102 (e.g., pausing an operation of the notification engine 214 or the communication module 216).

At operation 706, the server-side ransomware coordinating module 201 pauses a syncing operation between the server storage application 202 and the client storage application 108.

At operation 708, the server-side ransomware coordinating module 201 receives a remediation notification from the client-side ransomware coordinating module 112 indicating a non-remediable impacted file at the client device 102 (e.g., non-remediable by the client device 102).

At operation 710, the server-side ransomware coordinating module 201 updates the ransomware analysis engine 210 based on the detection event, the remediation notification, and information shared by the client-side ransomware coordinating module 112.

At operation 712, the server-side ransomware coordinating module 201 provides access to a non-impacted version of the file based on the detection event and the remediation notification, and information shared by the client-side ransomware coordinating module 112.

At operation 714, the server-side ransomware coordinating module 201 resumes server-side ransomware detection notifications to the client device 102 (e.g., resuming an operation of the notification engine 214 or the communication module 216).

At operation 716, the server-side ransomware coordinating module 201 resumes a syncing operation between the server storage application 202 and the client storage application 108.

Figure 8:
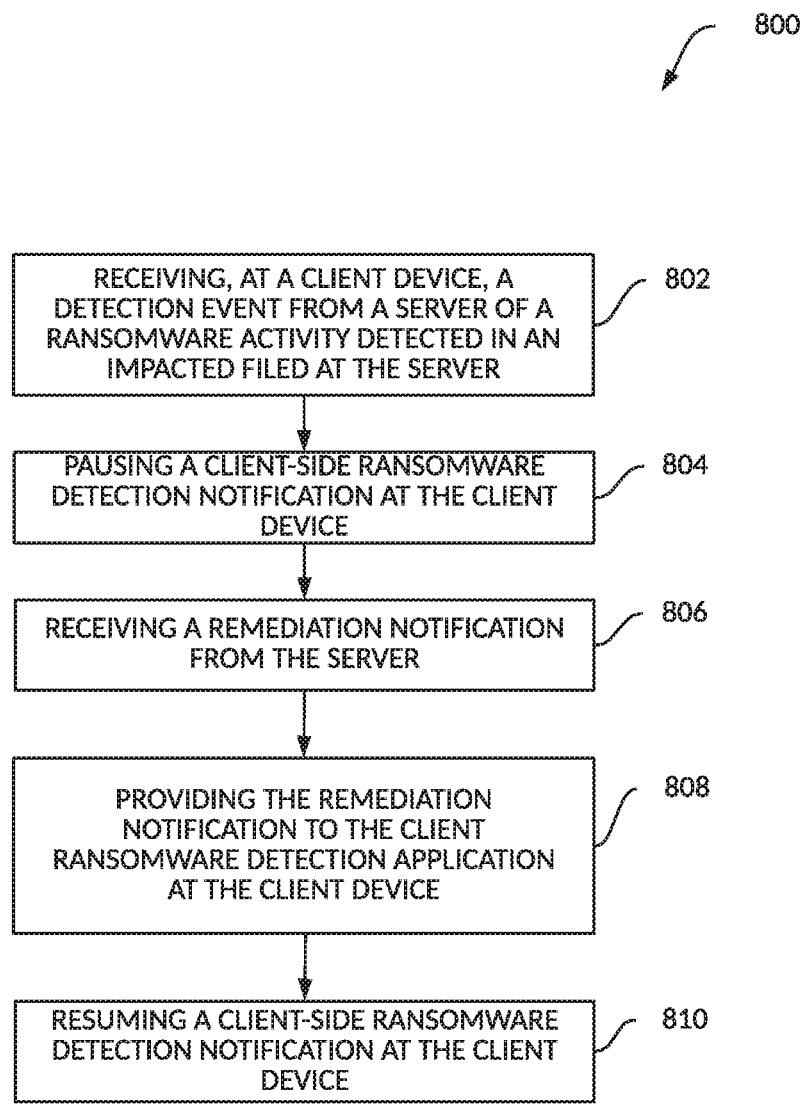
FIG. 8 is a flow diagram of a method for coordinating a ransomware detection at a client device in accordance with an example embodiment.

FIG. 8 is a flow diagram of a method for coordinating a ransomware detection at a storage system in accordance with an example embodiment. Operations in the method 800 may be performed by the client device 102, using components (e.g., modules, engines) described above with respect to FIG. 2. Accordingly, the method 800 is described by way of example with reference to the client device 102. However, it shall be appreciated that at least some of the operations of the method 800 may be deployed on various other hardware configurations or be performed by similar components residing elsewhere. For example, some of the operations may be performed at the storage system 106.

At operation 802, the client-side ransomware coordinating module 112 receives a detection event from the server-side ransomware coordinating module 201 indicating that a ransomware activity is detected by the storage system 106.

At operation 804, the client-side ransomware coordinating module 112 pauses a client-side ransomware detection notification from the client ransomware detection application 110.

At operation 806, the client-side ransomware coordinating module 112 receives a remediation notification from the server-side ransomware coordinating module 201 indicating that a ransomware activity at the storage system 106 has been remediated.

At operation 808, the client-side ransomware coordinating module 112 provides the remediation notification to the client ransomware detection application 110.

At operation 810, the client-side ransomware coordinating module 112 resumes detection notifications from the client ransomware detection application 110.

Figure 9:
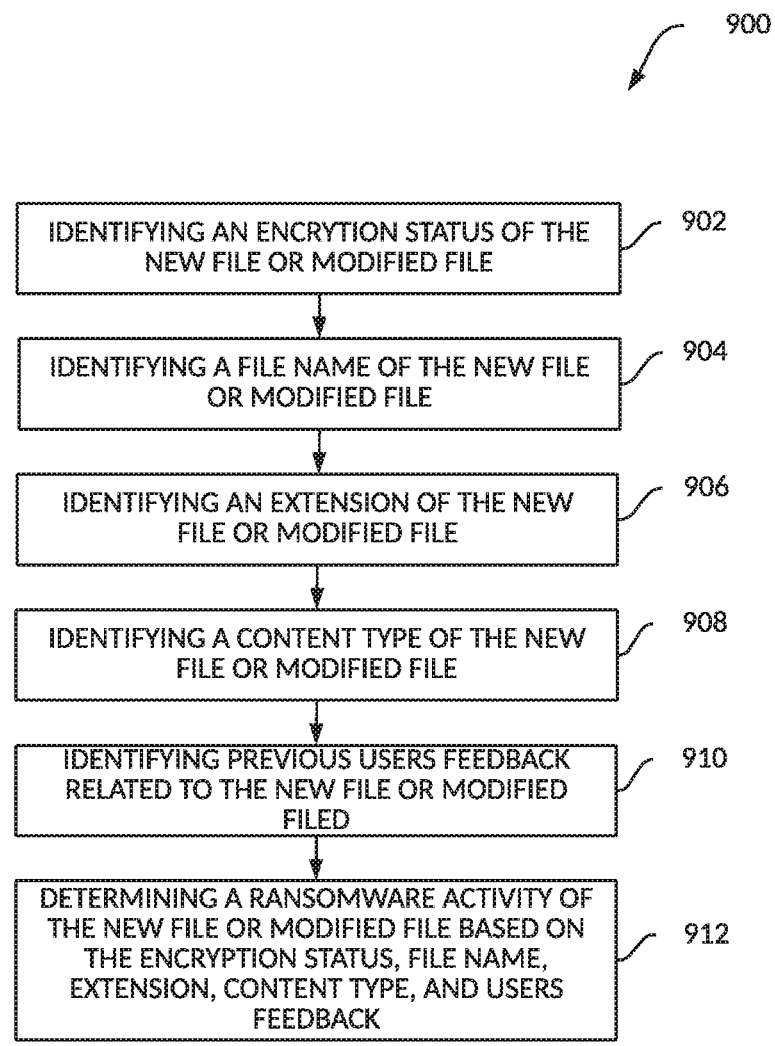
FIG. 9 is a flow diagram of a method for detecting a ransomware activity in accordance with another example embodiment.

FIG. 9 is a flow diagram of a method for determining a ransomware activity in a storage system in accordance with an example embodiment. Operations in the method 900 may be performed by the storage system 106, using components (e.g., modules, engines) described above with respect to FIG. 2. Accordingly, the method 900 is described by way of example with reference to the ransomware analysis engine 210. However, it shall be appreciated that at least some of the operations of the method 900 may be deployed on various other hardware configurations or be performed by similar components residing elsewhere. For example, some of the operations may be performed at the client device 102.

In operation 902, the encryption analysis module 304 identifies an encryption status of the new or modified file. For example, the encryption analysis module 304 determines whether the new or modified file is encrypted (and if so, whether the immediate previous version of the file stored at the data storage 206 is unencrypted).

In operation 904, the file naming analysis module 306 identifies a file name of the new or modified file.

In operation 906, the file naming analysis module 306 identifies a file extension name of the new or modified file.

In operation 908, the content analysis module 308 identifies a content type of the new or modified file. For example, the content analysis module 308 determines what the content of the new or modified file does not match with the name extension of the new or modified file.

In operation 910, the user feedback module 312 identifies previous user feedback (or other users feedback) related to the new or modified file.

In operation 912, the impacted file identification module 310 determines a ransomware activity of the new or modified file based on the encryption status, the file name, the extension, the content type, and the user's previous feedback.

Figure 10:
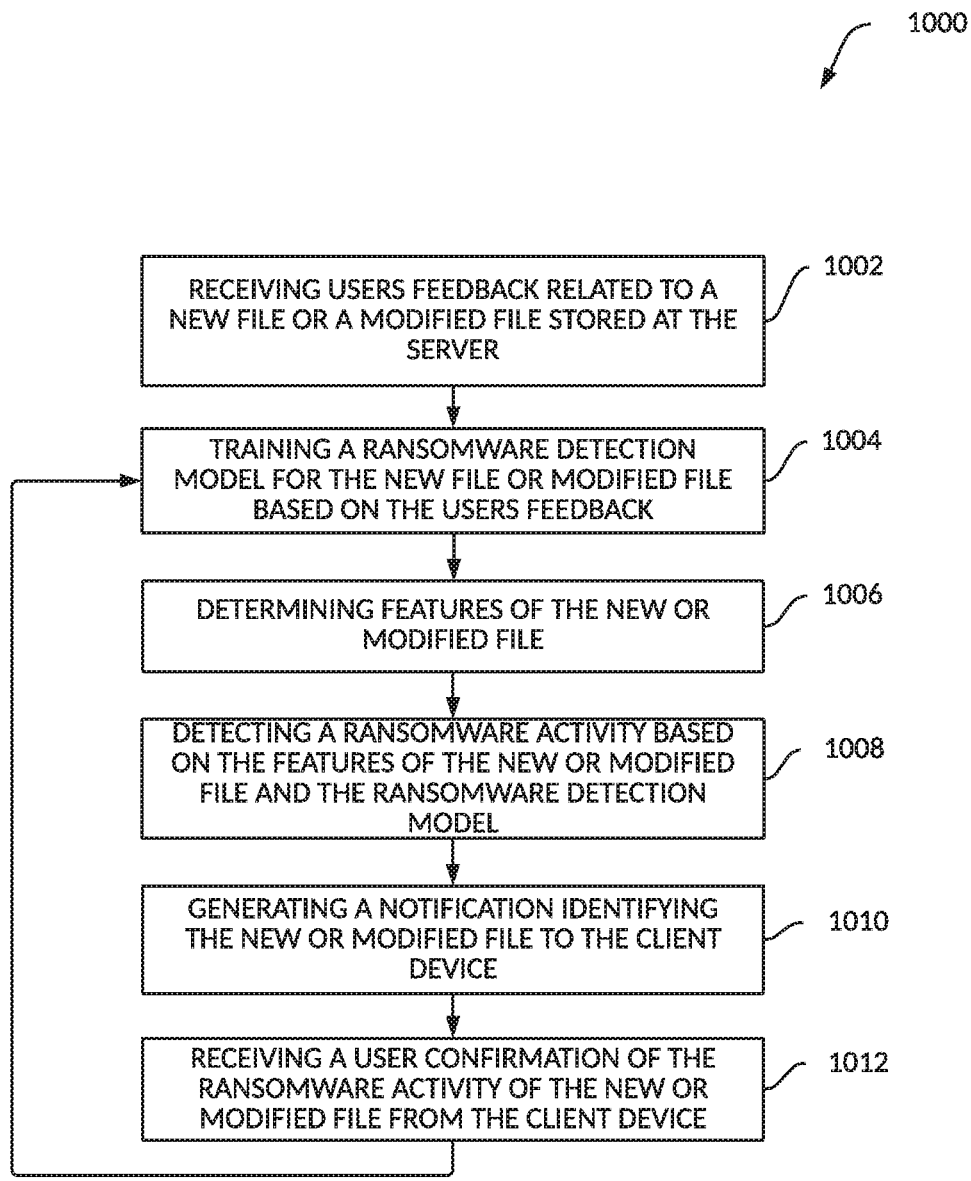
FIG. 10 is a flow diagram of a method for determining a ransomware activity in a storage system in accordance with an example embodiment.

FIG. 10 is a flow diagram of a method for determining a ransomware activity in a storage system in accordance with another example embodiment. Operations in the method 1000 may be performed by the storage system 106, using components (e.g., modules, engines) described above with respect to FIG. 2. Accordingly, the method 1000 is described by way of example with reference to the ransomware analysis engine 210. However, it shall be appreciated that at least some of the operations of the method 1000 may be deployed on various other hardware configurations or be performed by similar components residing elsewhere. For example, some of the operations may be performed at the client device 102.

In operation 1002, the user feedback module 312 receives previous feedback (from the user or other users) related to the new or modified file stored at the storage system 106.

In operation 1004, the learning engine 314 trains a ransomware detection model for the new or modified file based on the user's feedback.

In operation 1006, the feature extraction module 302 determines features of the new or modified file. Examples of features include an encryption status, a file or extension naming pattern, a content analysis matching result, and user feedback related to files similar to the new or modified file.

In operation 1008, the impacted file identification module 310 detects a ransomware activity (e.g., ransomware) based on the features of the new or modified file as previously determined in operation 1006 and based on the ransomware detection model as previously determined in operation 1004.

In operation 1010, the notification engine 214 generates a notification that identifies the new or modified file (based on the file identification from operation 1008) as potential ransomware to the client device 102. The communication module 216 sends the notification to the client device 102.

In operation 1012, the ransomware analysis engine 210 receives a user confirmation of the ransomware activity of the modified file from the client device 102 via the communication module 216. The ransomware analysis engine 210 provides the feedback (e.g., user confirmation) to the learning 314 (in operation 1004).

Figure 11:
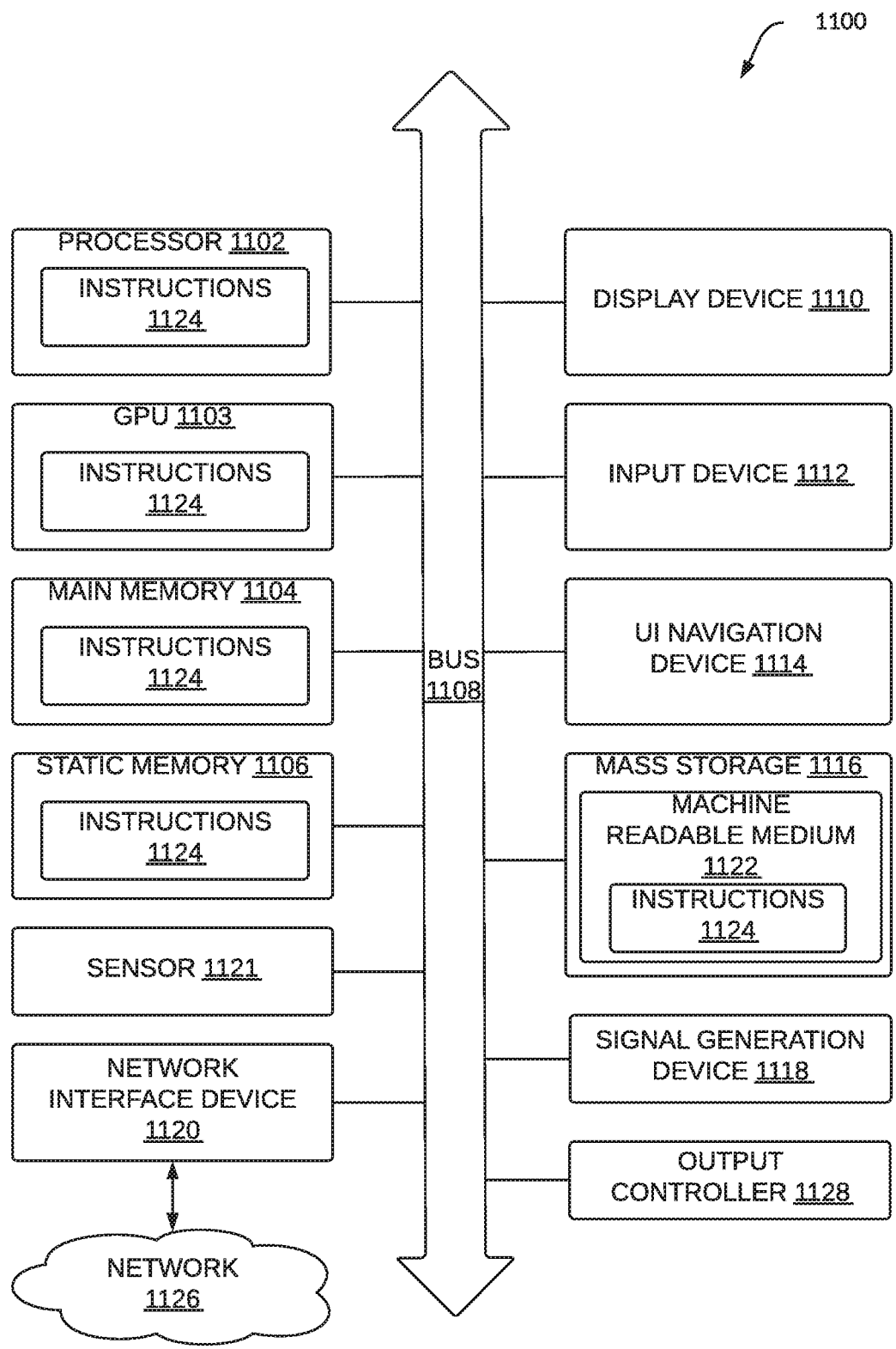
FIG. 11 is a diagrammatic representation of a machine in an example form of a computing system within which a set of instructions may be executed for causing the machine to perform any one or more of the methodologies discussed herein, according to an example embodiment.

FIG. 11 is a block diagram illustrating components of a machine 1100, according to some example embodiments, able to read instructions 1124 from a machine-readable medium 1122 and perform any one or more of the methodologies discussed herein, in whole or in part. Specifically, FIG. 11 shows the machine 1100 in the example form of a computer device (e.g., a computer) within which the instructions 1124 (e.g., software, a program, an application, an applet, an app, or other executable code) for causing the machine 1100 to perform any one or more of the methodologies discussed herein may be executed, in whole or in part.

For example, the instructions 1124 may cause the machine 1100 to execute the flows and flow diagrams of FIGS. 6-10. The instructions 1124 can transform the general, non-programmed machine 1100 into a particular machine (e.g., specially configured machine) programmed to carry out the described and illustrated functions in the manner described.

In alternative embodiments, the machine 1100 operates as a standalone device or may be connected (e.g., networked) to other machines. The machine 1100 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 1100 capable of executing the instructions 1124, sequentially or otherwise, that specify actions to be taken by that machine 1100. Further, while only a single machine 1100 is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a display device 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a UI navigation device 1114 (e.g., a mouse, a touchpad, a trackball, a joystick, a motion sensor, an eye tracking device, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes the machine-readable medium 1122 on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media 1122 (e.g., tangible and non-transitory machine-readable media).

In some example embodiments, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" (referred to collectively as "machine-readable medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or machine-readable media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and machine-readable media 1122 specifically exclude carrier waves, modulated data signals, and other such media, at least some of which are covered wider the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 may further be transmitted or received over a communications network 1126 using a transmission medium via the network interface device 1120 and utilizing any one of a number of well-known transfer protocols (e.g., HTTP). Examples of communications networks 1126 include a local area network (LAN), a wide area network (WAN), the Internet, mobile telephone networks, plain old telephone service (POTS) networks, and wireless data networks Wi-Fi, LTE, and WiMAX networks). The term "transmission medium" or "signal medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1122 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1102 or a group of processors 1102) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated, that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system for detecting ransomware in a storage of a server. The system includes one or more hardware processors; and a memory storing instructions that, when executed by the one or more hardware processors, cause the one or more hardware processors to perform operations comprising: receiving, at a cloud storage server, a detection notification from a client device, the cloud storage server configured to store files received from the client device, the detection notification indicating a ransomware activity detected by the client device; receiving, at the cloud storage server, a remediation notification from the client device, the remediation notification indicating that the ransomware activity has been remediated by the client device; and updating an operation of the cloud storage server based on the detection notification and the remediation notification.

In example 2, the subject matter of example 1 can optionally include wherein the detection notification is from a client-based cloud storage application operating at the client device or a client-based ransomware detection application operating at the client device, the detection notification indicating the ransomware activity detected by the client-based ransomware detection application.

In example 3, the subject matter of example 1 can optionally include wherein the remediation notification is from the client-based cloud storage application operating at the client device or the client-based ransomware detection application operating at the client device, the remediation notification indicating that the ransomware activity has been remediated by the client-based ransomware detection application.

In example 4, the subject matter of example 1 can optionally include wherein updating the operation of the cloud storage server comprises: updating an operation of a server-based ransomware detection application at the cloud storage server based on the detection notification and the remediation notification.

In example 5, the subject matter of example 4 can optionally include wherein updating the operation of the server-based ransomware detection comprises: pausing a syncing operation between a client-based cloud storage application at the client device and the cloud storage server in response to receiving the detection notification at the cloud storage server; and resuming the syncing operation between the client-based cloud storage application and the cloud storage server in response to receiving the remediation notification at the cloud storage server.

In example 6, the subject matter of example 4 can optionally include wherein updating the operation of the server-based ransomware detection comprises: performing a syncing operation between a client-based cloud storage application at the client device and the cloud storage server in response to receiving the detection notification at the cloud storage server; and receiving one or more remediated files from a client-based ransomware detection application or the client-based cloud storage application in response to receiving the detection notification at the cloud storage server.

In example 7, the subject matter of example 1 can optionally include wherein the detection notification comprises an identification of one or more files compromised by the ransomware activity and a timestamp of a detection of the ransomware activity by a client-based ransomware detection application, wherein the remediation notification comprises an identification of one or more remediated files and a timestamp of a remediation of the ransomware activity by the client-based ransomware detection application.

Example 8 is a computer-implemented method, the computer-implemented method comprising: generating, at a cloud storage server, a detection notification to a client device, the cloud storage server configured to store files received from the client device, the detection notification indicating a ransomware activity detected by the cloud storage server; communicating, from the cloud storage server, a remediation notification to the client device, the remediation notification indicating that the ransomware activity has been remediated by the cloud storage server; and updating an operation of the cloud storage server based on the detection notification and the remediation notification.

In example 9, the subject matter of example 8 can optionally include wherein the detection notification is from a server-side ransomware coordinating module operating at the cloud storage server, the detection notification indicating the ransomware activity detected by a ransomware analysis engine of the cloud storage server.

In example 10, the subject matter of example 9 can optionally include: pausing a syncing operation between a client-based cloud storage application at the client device and the cloud storage server in response to generating the detection notification at the cloud storage server; and resuming the syncing operation between the client-based cloud storage application and the cloud storage server in response to receiving the remediation notification at the cloud storage server.

Example 11 is a system. The system comprises: one or more hardware processors; and a memory storing instructions that, when executed by the one or more hardware processors, cause the one or more hardware processors to perform operations comprising:
receiving, at a cloud storage server, a detection notification from a client device, the cloud storage server configured to store files received from the client device, the detection notification indicating a ransomware activity detected by the client device;
receiving, at the cloud storage server, a remediation notification from the client device, the remediation notification indicating that the ransomware activity has been remediated by the client device; and
updating an operation of the cloud storage server based on the detection notification and the remediation notification.

In example 12, the subject matter of example 11 can optionally include wherein the detection notification is from a client-based cloud storage application operating at the client device or a client-based ransomware detection application operating at the client device, the detection notification indicating the ransomware activity detected by the client-based ransomware detection application.

In example 13, the subject matter of example 12 can optionally include wherein the remediation notification is from the client-based cloud storage application operating at the client device or the client-based ransomware detection application operating at the client device, the remediation notification indicating that the ransomware activity has been remediated by the client-based ransomware detection application.

In example 14, the subject matter of example 11 can optionally include wherein updating the operation of the cloud storage server comprises:
updating an operation of a server-based ransomware detection application at the cloud storage server based on the detection notification and the remediation notification.

In example 15, the subject matter of example 14 can optionally include wherein updating the operation of the server-based ransomware detection comprises:
pausing a syncing operation between a client-based cloud storage application at the client device and the cloud storage server in response to receiving the detection notification at the cloud storage server; and
resuming the syncing operation between the client-based cloud storage application and the cloud storage server in response to receiving the remediation notification at the cloud storage server.

In example 16, the subject matter of example 14 can optionally include wherein updating the operation of the server-based ransomware detection comprises:
performing a syncing operation between a client-based cloud storage application at the client device and the cloud storage server in response to receiving the detection notification at the cloud storage server; and
receiving one or more remediated files from a client-based ransomware detection application or the client-based cloud storage application in response to receiving the detection notification at the cloud storage server.

In example 17, the subject matter of example 11 can optionally include wherein the detection notification comprises an identification of one or more files compromised by the ransomware activity and a timestamp of a detection of the ransomware activity by a client-based ransomware detection application,
wherein the remediation notification comprises an identification of one or more remediated files and a timestamp of a remediation of the ransomware activity by the client-based ransomware detection application.

Example 18 is a machine-storage medium storing instructions that, when executed by one or more processors of a machine, cause the one or more processors to perform operations comprising:
receiving, at a cloud storage server, a detection notification from a client device, the cloud storage server configured to store files received from the client device, the detection notification indicating a ransomware activity detected by the client device;
receiving, at the cloud storage server, a remediation notification from the client device, the remediation notification indicating that the ransomware activity has been remediated by the client device; and
updating an operation of the cloud storage server based on the detection notification and the remediation notification.

In example 19, the subject matter of example 18 can optionally include wherein the detection notification is from a client-based cloud storage application operating at the client device or a client-based ransomware detection application operating at the client device, the detection notification indicating the ransomware activity detected by the client-based ransomware detection application.

In example 20, the subject matter of example 19 can optionally include wherein the remediation notification is from the client-based cloud storage application operating at the client device or the client-based ransomware detection application operating at the client device, the remediation notification indicating that the ransomware activity has been remediated by the client-based ransomware detection application.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
receiving, at a cloud storage server, a detection notification from a client device, the cloud storage server configured to store files received from the client device, the detection notification indicating a ransomware activity detected by the client device;
in response to receiving the detection notification from the client device, pausing, at the cloud storage server, a server-based ransomware detection notification designated for the client device without communicating the server-based ransomware detection notification to the client device;
receiving, at the cloud storage server, a remediation notification from the client device, the remediation notification comprising a remediation flag that indicates that the client device has successfully cleaned a file impacted by the ransomware activity;
in response to receiving the remediation notification from the client device, resuming, at the cloud storage server, the server-based ransomware detection notification designated for the client device; and
updating an operation of the cloud storage server based on the detection notification and the remediation notification.

2. The computer-implemented method of claim 1, wherein the detection notification is from a client-based cloud storage application operating at the client device or a client-based ransomware detection application operating at the client device, the detection notification indicating the ransomware activity detected by the client-based ransomware detection application.

3. The computer-implemented method of claim 2, wherein the remediation notification is from the client-based cloud storage application operating at the client device or the client-based ransomware detection application operating at the client device, the remediation notification indicating that the ransomware activity has been remediated by the client-based ransomware detection application.

4. The computer-implemented method of claim 1, wherein updating the operation of the cloud storage server comprises:
 updating an operation of a server-based ransomware detection application at the cloud storage server based on the detection notification and the remediation notification.

5. The computer-implemented method of claim 4, wherein updating the operation of the server-based ransomware detection comprises:
 pausing a syncing operation between a client-based cloud storage application at the client device and the cloud storage server in response to receiving the detection notification at the cloud storage server; and
 resuming the syncing operation between the client-based cloud storage application and the cloud storage server in response to receiving the remediation notification at the cloud storage server.

6. The computer-implemented method of claim 4, wherein updating the operation of the server-based ransomware detection comprises:
 performing a syncing operation between a client-based cloud storage application at the client device and the cloud storage server in response to receiving the detection notification at the cloud storage server; and
 receiving one or more remediated files from a client-based ransomware detection application or the client-based cloud storage application in response to receiving the detection notification at the cloud storage server.

7. The computer-implemented method of claim 1, wherein the detection notification comprises an identification of one or more files compromised by the ransomware activity and a timestamp of a detection of the ransomware activity by a client-based ransomware detection application,
 wherein the remediation notification comprises an identification of one or more remediated files and a timestamp of a remediation of the ransomware activity by the client-based ransomware detection application.

8. A computer-implemented method comprising:
 generating, at a cloud storage server, a server-side detection notification to a client device, the cloud storage server configured to store files received from the client device, the server-side detection notification indicating a ransomware activity detected by the cloud storage server, the client device being configured to pause a client-side detection notification in response to receiving the server-side detection notification from the cloud storage server without communicating the client-side detection notification to the cloud storage server;
 communicating, from the cloud storage server, a remediation notification to the client device, the remediation notification comprising a remediation flag indicating that the ransomware activity has been remediated by the cloud storage server, the client device being configured to resume a client-side detection notification in response receiving the remediation flag from the cloud storage server; and
 updating an operation of the cloud storage server based on the detection notification and the remediation notification.

9. The computer-implemented method of claim 8, wherein the server-side detection notification is from a server-side ransomware coordinating module operating at the cloud storage server, the server-side detection notification indicating the ransomware activity detected by a ransomware analysis engine of the cloud storage server.

10. The computer-implemented method of claim 9, further comprising:
 pausing a syncing operation between a client-based cloud storage application at the client device and the cloud storage server in response to generating the server-side detection notification at the cloud storage server; and
 resuming the syncing operation between the client-based cloud storage application and the cloud storage server in response to the remediation notification at the cloud storage server.

11. A system comprising:
 one or more hardware processors; and
 a memory storing instructions that, when executed by the one or more hardware processors, cause the one or more hardware processors to perform operations comprising:
 receiving, at a cloud storage server, a detection notification from a client device, the cloud storage server configured to store files received from the client device, the detection notification indicating a ransomware activity detected by the client device;
 in response to receiving the detection notification from the client device, pausing, at the cloud storage server, a server-based ransomware detection notification designated for the client device without communicating the server-based ransomware detection notification to the client device;
 receiving, at the cloud storage server, a remediation notification from the client device, the remediation notification comprising a remediation flag that indicates that the client device has successfully cleaned a file impacted by the ransomware activity;
 in response to receiving the remediation notification from the client device, resuming, at the cloud storage server, the server-based ransomware detection notification designated for the client device; and
 updating an operation of the cloud storage server based on the detection notification and the remediation notification.

12. The system of claim 11, wherein the detection notification is from a client-based cloud storage application operating at the client device or a client-based ransomware detection application operating at the client device, the detection notification indicating the ransomware activity detected by the client-based ransomware detection application.

13. The system of claim 12, wherein the remediation notification is from the client-based cloud storage application operating at the client device or the client-based ransomware detection application operating at the client device, the remediation notification indicating that the ransomware activity has been remediated by the client-based ransomware detection application.

14. The system of claim 11, wherein updating the operation of the cloud storage server comprises:

updating an operation of a server-based ransomware detection application at the cloud storage server based on the detection notification and the remediation notification.

15. The system of claim 14, wherein updating the operation of the server-based ransomware detection comprises:
pausing a syncing operation between a client-based cloud storage application at the client device and the cloud storage server in response to receiving the detection notification at the cloud storage server; and
resuming the syncing operation between the client-based cloud storage application and the cloud storage server in response to receiving the remediation notification at the cloud storage server.

16. The system of claim 14, wherein updating the operation of the server-based ransomware detection comprises:
performing a syncing operation between a client-based cloud storage application at the client device and the cloud storage server in response to receiving the detection notification at the cloud storage server; and
receiving one or more remediated files from a client-based ransomware detection application or the client-based cloud storage application in response to receiving the detection notification at the cloud storage server.

17. The system of claim 11, wherein the detection notification comprises an identification of one or more files compromised by the ransomware activity and a timestamp of a detection of the ransomware activity by a client-based ransomware detection application,
wherein the remediation notification comprises an identification of one or more remediated files and a timestamp of a remediation of the ransomware activity by the client-based ransomware detection application.

18. A machine-storage medium storing instructions that, when executed by one or more processors of a machine, cause the one or more processors to perform operations comprising:
receiving, at a cloud storage server, a detection notification from a client device, the cloud storage server configured to store files received from the client device, the detection notification indicating a ransomware activity detected by the client device;
in response to receiving the detection notification from the client device, pausing, at the cloud storage server, a server-based ransomware detection notification designated for the client device without communicating the server-based ransomware detection notification to the client device;
receiving, at the cloud storage server, a remediation notification from the client device, the remediation notification comprising a remediation flag that indicates that the client device has successfully cleaned a file impacted by the ransomware activity;
in response to receiving the remediation notification from the client device, resuming, at the cloud storage server, the server-based ransomware detection notification designated for the client device; and
updating an operation of the cloud storage server based on the detection notification and the remediation notification.

19. The machine-storage medium of claim 18, wherein the detection notification is from a client-based cloud storage application operating at the client device or a client-based ransomware detection application operating at the client device, the detection notification indicating the ransomware activity detected by the client-based ransomware detection application.

20. The machine-storage medium of claim 19, wherein the remediation notification is from the client-based cloud storage application operating at the client device or the client-based ransomware detection application operating at the client device, the remediation notification indicating that the ransomware activity has been remediated by the client-based ransomware detection application.

* * * * *